United States Patent
Norman et al.

(10) Patent No.: US 12,423,449 B2
(45) Date of Patent: Sep. 23, 2025

(54) METHOD AND SYSTEM FOR PROVIDING ACCESS CONTROL GOVERNANCE

(71) Applicant: JPMorgan Chase Bank, N.A., New York, NY (US)

(72) Inventors: Michael George Norman, Edinburgh (GB); Isaac Leonardo Blum, Armonk, NY (US); Roger F Bigger, Old Lyme, CT (US); David Laurance, Ann Arbor, MI (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 342 days.

(21) Appl. No.: 17/658,336

(22) Filed: Apr. 7, 2022

(65) Prior Publication Data

US 2022/0327223 A1  Oct. 13, 2022

Related U.S. Application Data

(60) Provisional application No. 63/171,850, filed on Apr. 7, 2021.

(51) Int. Cl.
*G06F 21/60* (2013.01)
*H04L 9/40* (2022.01)

(52) U.S. Cl.
CPC .... *G06F 21/604* (2013.01); *G06F 2212/7202* (2013.01); *G06F 2221/2101* (2013.01); *H04L 63/108* (2013.01); *H04L 63/20* (2013.01)

(58) Field of Classification Search
CPC ........... G06F 21/604; G06F 2212/7202; H04L 63/20; H04L 63/108
See application file for complete search history.

(56) References Cited

U.S. PATENT DOCUMENTS

| | | | |
|---|---|---|---|
| 9,043,862 B2 | 5/2015 | Ahmavaara et al. | |
| 9,083,749 B1* | 7/2015 | Roth | H04L 63/10 |
| 10,764,752 B1 | 9/2020 | Avetisov et al. | |
| 11,134,058 B1* | 9/2021 | Sole | G06F 21/552 |
| 2008/0184336 A1 | 7/2008 | Sarukkai et al. | |
| 2019/0394259 A1 | 12/2019 | Park et al. | |

(Continued)

OTHER PUBLICATIONS

International Search Report and Written Opinion in corresponding International PCT Application No. PCT/US2022/023821, dated Sep. 7, 2022.

(Continued)

*Primary Examiner* — Ellen Tran
(74) *Attorney, Agent, or Firm* — GREENBLUM & BERNSTEIN, P.L.C.

(57) ABSTRACT

A method for governing a policy for providing access to a system is provided. The method includes: receiving a plurality of policy data units, each respective policy data unit including information that relates to an access determination with respect to the system; processing the plurality of policy data units by constructing a first directed graph of policy data unit processors, and obtaining an access policy rule as a result of the processing; evaluating the obtained access policy rule across a compute environment that is distributed in time and space by using the first directed graph; generating a signed access token that relates to a predetermined user based on the obtained access policy rule; and transmitting the signed access token to the predetermined user.

20 Claims, 12 Drawing Sheets

(56) References Cited

U.S. PATENT DOCUMENTS

2020/0127994 A1     4/2020   Kukreja et al.
2020/0244702 A1     7/2020   Ambardekar et al.
2020/0314145 A1*   10/2020   Bolignano .............. H04L 63/20
2021/0051178 A1*    2/2021   Kuppannan ............. H04L 63/20
2021/0136117 A1*    5/2021   Kuppannan ............. H04L 63/20
2021/0266306 A1*    8/2021   Furman ................. H04L 63/205

OTHER PUBLICATIONS

Extended European Search Report in corresponding European Application No. 22785437.9, dated Oct. 16, 2024.
Dhankhar et al., "Evaluating Distributed XACML Policies", Proceedings of the 2007 ACM Workshop on Secure Web Services, Fairfax, VA, USA, Nov. 2, 2007, pp. 99-110.
Hartmann et al., "A Case Study in Decentralized, Dynamic, Policy-Based, Authorization and Trust Management—Automated Software Distribution for Airplanes", SAT 2015 $18^{th}$ International Conference, Austin, TX, USA, Jan. 1, 2011, pp. 68-83.

* cited by examiner

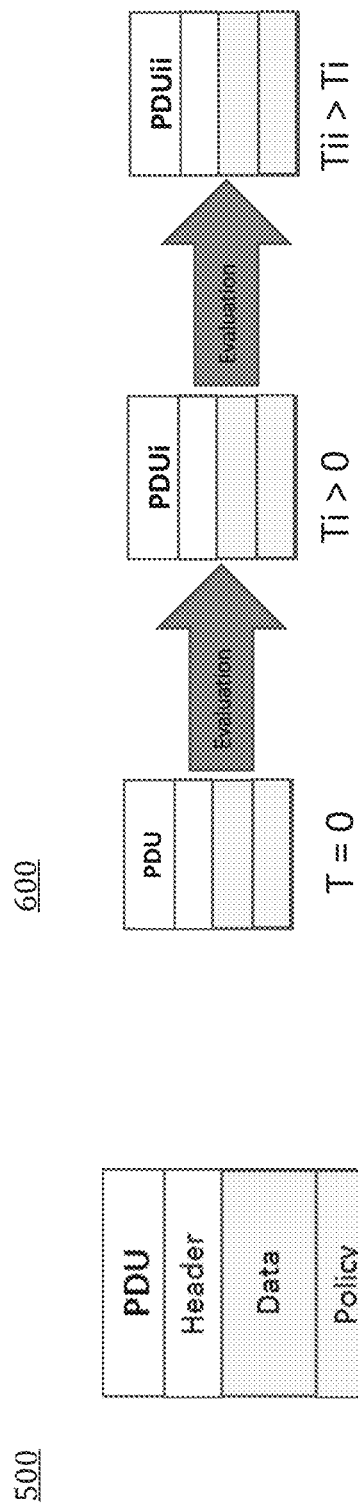

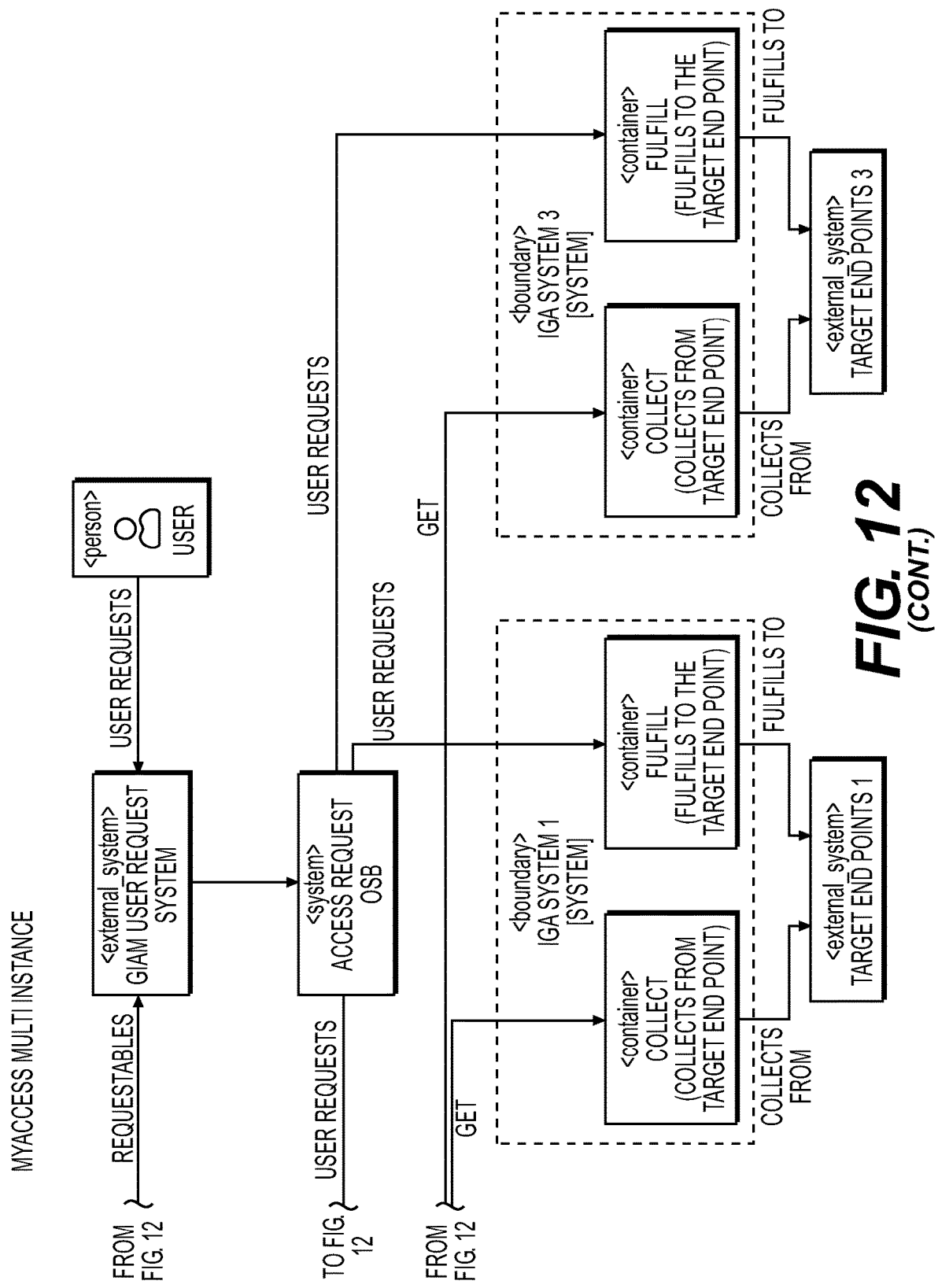

METHOD AND SYSTEM FOR PROVIDING ACCESS CONTROL GOVERNANCE

CROSS-REFERENCE TO RELATED APPLICATIONS

This application claims the benefit of U.S. Provisional Patent Application Ser. No. 63/171,850, filed Apr. 7, 2021, which is hereby incorporated by reference in its entirety.

BACKGROUND

1. Field of the Disclosure

This technology generally relates to methods and systems for controlling access to information, and more particularly, to methods and systems for governing a policy for controlling functional access and data access to information resources.

2. Background Information

With the migration to cloud-based services, software applications and services that were once monolithic are being refactored into small, encapsulated units of business behavior, computation, and storage, each with discrete responsibility within a small, narrowly defined scope. These "microservices" are then assembled into collaborative communities of functionality. Securing and providing correct access to these microservices and the data they manage requires a new and unique design, specifically including a new approach to controls architecture.

Previous efforts to comprehensively address this access control problem at scale include Role Based Access Control (RBAC), Extensible Access Control Markup Language (XACML), Next Generation Access Control (NGAC) and others.

XACML: Though a deployment of the full XACML specification is rare, it remains a useful and commonly referenced architecture for access policy. The foundation of the XACML architecture is a logical separation of concerns that treats policy decisions as separate in both space and time from the enforcement of those decisions. This separation is captured in the XACML definition of the Policy Decision Point (PDP) as a separate logical component.

The XACML logical architecture is further decomposed to support policy evaluation. The PDP combines information from multiple sources to render a decision: 1) An access request contains attributes that describe the nature of the access being requested. 2) Supporting information is taken from additional data sources, through a XACML construct called a Policy Information Point (PIP). 3) A set of decision rules, expressed as a XACML Policy, is sourced from a system known as a Policy Retrieval Point (PRP). The PDP renders a decision to allow or deny access, based upon this combination of information. The rendered decision is then passed to a Policy Enforcement Point (PEP), which acts as a gate controlling access.

The problem with the XACML architecture is that it generally presupposes that the request, the rules in the policy, and the supporting information can be pulled together at the same time by the PDP, and that the PDP is capable of rendering a complete decision at that single point in time. There are several different reasons that this is either impractical, inefficient, or simply impossible: 1) A data security decision may require information about how software is built and tested, how it is deployed, how its container or run-time environment is secured, and what data protection mechanisms are required for specific data that is requested. It may not be practical to assemble this information within a single decision point. 2) A single policy decision may be best enforced over multiple different enforcement mechanisms. For instance, a decision to prohibit communication could require enforcement as firewall rules, in the configuration of an API gateway, and within an application or data service. 3) A policy decision at the point of data access may carry a requirement for action that must occur immediately before the action is completed. For example, user approval/authorization may be required for a specific transaction. 4) A policy decision may require action such as audit or data retention that must be accomplished at some future time.

A key shortcoming with the approach outlined in the XACML architecture pertains to the concept of "Point" in time and location that is inherent in design elements such as "Policy Decision Point." In practice, this leads to implementation issues, particularly in the area of scalability. As the XACML design largely overlooks the temporal component, this poses a very real constraint on when information can be available to perform an access computation. XACML attempts to address this temporal gap by supporting an obligation that must be performed in some circumstances at some time in the future.

While XACML supports the ability to attach an obligation to a decision—essentially a definition of future requirement that is associated with a policy evaluation—the obligation (insofar as it may contains a condition which determines access) is an opaque entity that is materially different from the rules which determine how it is generated. Thus, the obligation cannot itself be evaluated as XACML policy, and each specific must be handled somehow by application code.

The net result is that a XACML decision is treated as final from the perspective of the policy engine, and this "final decision orientation" makes it difficult to provide functionality supporting requirements for future activities ("obligations") such as audit or data retention requirements. In the end, this approach is weak, and XACML Obligations are unstructured tags, a form of "proofs left to the reader." As a result, commercial and open source implementations of XACML often will not make use of the Obligation feature but will instead decorate their systems with other solutions that depend upon data usage conventions and can lead to vendor lock-in.

Use of partial evaluation: U.S. Patent Application Publication No. US 2020/0410125 A1 (hereinafter "the '125 Publication"), entitled "METHOD FOR DEFINING POLICY ACROSS INFORMATION MODEL EXPOSED VIA AN APPLICATION PROGRAMMING INTERFACE," discloses that a XACML obligation to control data access that may be emitted by a XACML PDP is fundamentally the same in nature as the policy to which it is associated. It also discloses a mechanism by which policy can be passed across the boundary of an Application Programming Interface (API) so that it can be resolved by the Application or by an underlying data service.

The '125 Publication also discloses that " . . . because simple predicates in the policy are well-formed with respect to the information model, the simple predicates may be substituted with concrete value sets from the information model. As a result, there is an ability to perform partial evaluation of the policy against multiple systems and substitutions of resulting value sets before the policy is introduced to the active system for final resolution. Therefore, incremental evaluation of an enterprise-wide policy may be performed without a requirement for a centralized policy decision engine to access all relevant attributes."

However, the '125 Publication does not provide a solution for partitioning such an incremental evaluation over the controls architecture in a manner that would address how the policy and its supporting processes can be made authoritative, tamper proof and highly efficient, as may be seen when the question "how is the Policy attached to the API call?" is asked.

Clearly, it should not be singularly up to a User to assert to the Application the policy that controls the User's own access, or indeed any additional information about themselves that they wish the Resource Server to take into consideration in evaluating that policy. Nor should it be up to the Client (i.e., the software agent through which the User is interacting and which is actually making the API calls on the user's behalf) to unilaterally assert these things. Insofar as the Client is able to assert the Policy the Application is to use for the User, it must do so within a controls architecture which allows the Application to determine that the policy is correct.

SUMMARY

The present disclosure, through one or more of its various aspects, embodiments, and/or specific features or sub-components, provides, inter alia, various systems, servers, devices, methods, media, programs, and platforms for governing a policy for controlling functional access and data access to information resources.

According to an aspect of the present disclosure, a method for governing a policy for controlling access to a system is provided. The method is implemented by at least one processor. The method includes: receiving, by the at least one processor, a plurality of policy data units, each respective policy data unit including information that relates to an access determination with respect to the system; processing, by the at least one processor, the plurality of policy data units, and obtaining an access policy rule as a result of the processing; generating, by the at least one processor, a signed access token that relates to a predetermined user based on the obtained access policy rule; and transmitting, by the at least one processor to the predetermined user, the signed access token.

Each of the plurality of policy data units may include one from among a first simple type of policy data unit that contains a header and data with no policy logic, a second simple type of policy data unit that contains a header and policy logic with no data, and a compound type of policy data unit that contains a header, data, and policy logic.

The processing of the plurality of policy data units may include constructing a first directed graph of policy data unit processors. The method may further include evaluating the obtained access policy rule across a compute environment that is distributed in time and space by using the first directed graph.

The evaluating of the obtained access policy rule may be performed incrementally as corresponding software is built, tested, and deployed.

The evaluating of the obtained access policy rule may be performed across a cloud computing environment that varies over time, such that at least one portion of the obtained access policy rule is revised as a result of a variation of the cloud computing environment.

The method may further include constructing a second directed graph of the policy data unit processors and assessing a use of the access policy rule with respect to at least one from among correctness, completeness, and consistency by using the second directed graph.

The assessing of the use of the access policy rule may include using at least one detective control included in the second directed graph to determine whether the access policy rule is executing as designed and to determine whether at least one from among the access policy rule and reference data associated with the access policy rule has been subjected to tampering.

The method may further include using the second directed graph to generate an auditable record of decisions made based on the first directed graph.

According to another aspect of the present disclosure, a computing apparatus for governing a policy for controlling access to a system is provided. The computing apparatus includes a first processor, a memory, and a communication interface coupled to each of the first processor and the memory. The processor is configured to: receive, via the communication interface, a plurality of policy data units, each respective policy data unit including information that relates to an access determination with respect to the system; process the plurality of policy data units and obtain an access policy rule as a result of the processing; generate a signed access token that relates to a predetermined user based on the obtained access policy rule; and transmit, to the predetermined user via the communication interface, the signed access token.

Each of the plurality of policy data units may include one from among a first simple type of policy data unit that contains a header and data with no policy logic, a second simple type of policy data unit that contains a header and policy logic with no data, and a compound type of policy data unit that contains a header, data, and policy logic.

The processing of the plurality of policy data units may include constructing a first directed graph of policy data unit processors. The first processor may be further configured to evaluate the obtained access policy rule across a compute environment that is distributed in time and space by using the first directed graph.

The evaluation of the obtained access policy rule may be performed incrementally as corresponding software is built, tested, and deployed.

The evaluation of the obtained access policy rule may be performed across a cloud computing environment that varies over time, such that at least one portion of the obtained access policy rule is revised as a result of a variation of the cloud computing environment.

The first processor may be further configured to construct a second directed graph of the policy data unit processors and assess a use of the access policy rule with respect to at least one from among correctness, completeness, and consistency by using the second directed graph.

The assessment of the use of the access policy rule may include using at least one detective control included in the second directed graph to determine whether the access policy rule is executing as designed and to determine whether at least one from among the access policy rule and reference data associated with the access policy rule has been subjected to tampering.

The first processor may be further configured to use the second directed graph to generate an auditable record of decisions made based on the first directed graph.

According to yet another aspect of the present disclosure, a non-transitory computer readable storage medium storing instructions for governing a policy for controlling access to a system is provided. The storage medium includes executable code which, when executed by a processor, causes the processor to: receive a plurality of policy data units, each respective policy data unit including information that relates to an access determination with respect to the system; process the plurality of policy data units, and obtain an access policy rule as a result of the processing; generate a signed access token that relates to a predetermined user based on the obtained access policy rule; and transmit, to the predetermined user, the signed access token.

Each of the plurality of policy data units may include one from among a first simple type of policy data unit that contains a header and data with no policy logic, a second simple type of policy data unit that contains a header and policy logic with no data, and a compound type of policy data unit that contains a header, data, and policy logic.

The executable code may be further configured to cause the processor to: construct a first directed graph of policy data unit processors; and evaluate the obtained access policy rule across a compute environment that is distributed in time and space by using the first directed graph.

The executable code may be further configured to construct a second directed graph of the policy data unit processors and assess a use of the access policy rule with respect to at least one from among correctness, completeness, and consistency by using the second directed graph.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 is a diagram that illustrates the structure of a policy data unit (PDU), according to an exemplary embodiment.

FIG. 6 is a diagram that illustrates a combination of PDUs into a chain, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
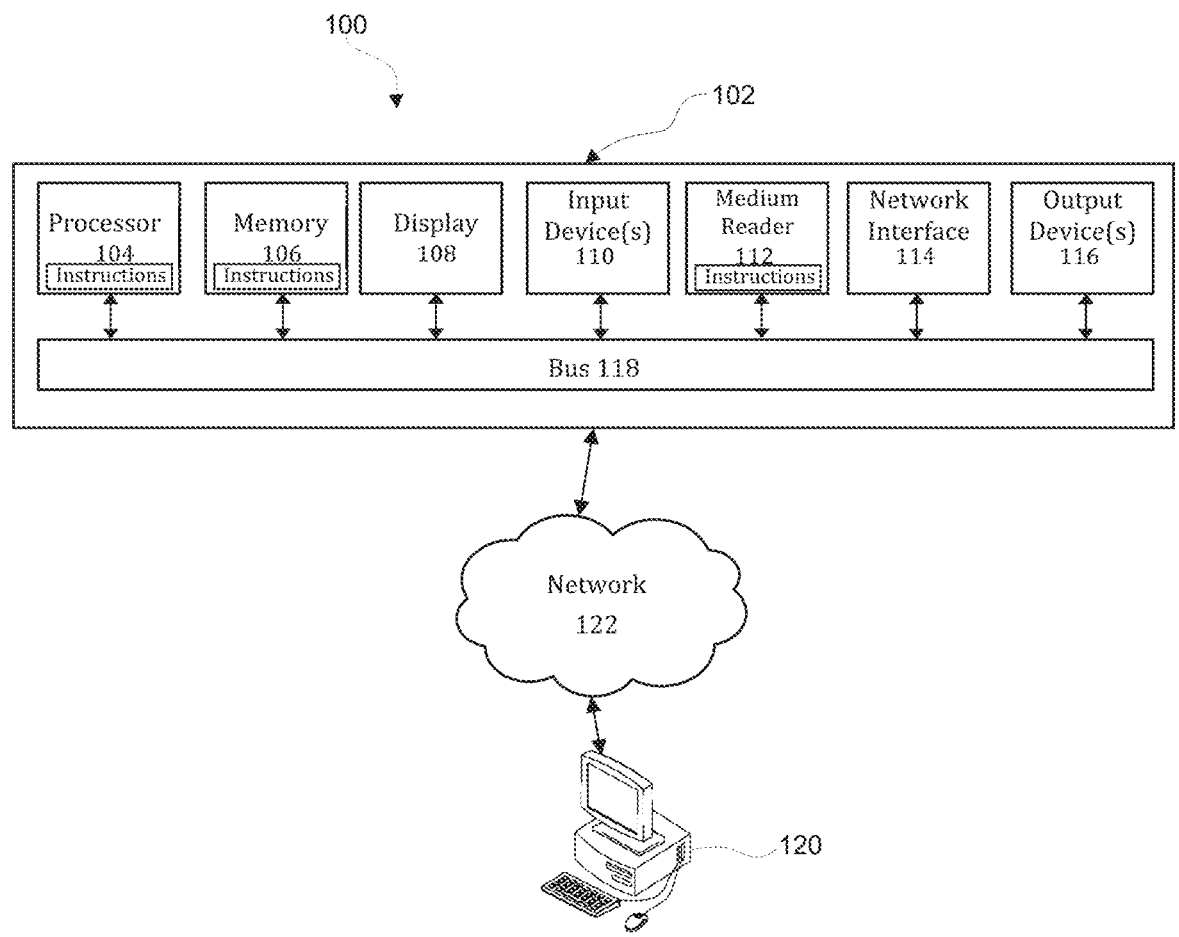
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for governing a policy for controlling functional access and data access to information resources.

Figure 2:
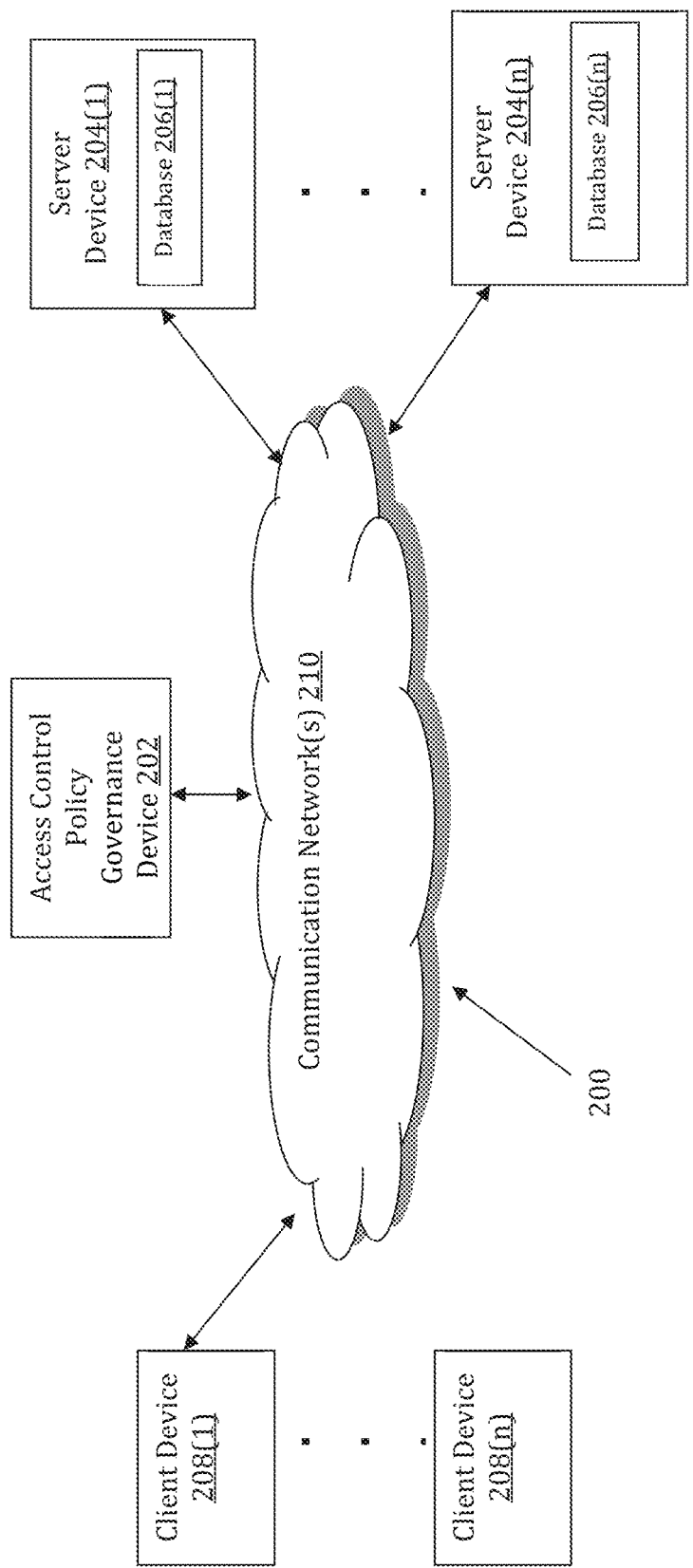
FIG. 2 illustrates an exemplary diagram of a network environment.

Referring to FIG. 2, a schematic of an exemplary network environment 200 for implementing a method for governing a policy for controlling functional access and data access to information resources is illustrated. In an exemplary embodiment, the method is executable on any networked computer platform, such as, for example, a personal computer (PC).

The method for governing a policy for controlling functional access and data access to information resources may be implemented by an Access Control Policy Governance (ACPG) device 202. The ACPG device 202 may be the same or similar to the computer system 102 as described with respect to FIG. 1. The ACPG device 202 may store one or more applications that can include executable instructions that, when executed by the ACPG device 202, cause the ACPG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ACPG device 202 itself, may be located in virtual server(s) running in a cloud-based computing environment rather than being tied to one or more specific physical network computing devices. Also, the application(s) may be running in one or more virtual machines (VMs) executing on the ACPG device 202. Additionally, in one or more embodiments of this technology, virtual machine(s) running on the ACPG device 202 may be managed or supervised by a hypervisor.

In the network environment 200 of FIG. 2, the ACPG device 202 is coupled to a plurality of server devices 204(1)-204(n) that hosts a plurality of databases 206(1)-206(n), and also to a plurality of client devices 208(1)-208(n) via communication network(s) 210. A communication interface of the ACPG device 202, such as the network interface 114 of the computer system 102 of FIG. 1, operatively couples and communicates between the ACPG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ACPG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ACPGD devices that efficiently implement a method for governing a policy for controlling functional access and data access to information resources.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ACPG device 202 may be a standalone device or integrated with one or more other devices or apparatuses, such as one or more of the server devices 204(1)-204(n), for example. In one particular example, the ACPG device 202 may include or be hosted by one of the server devices 204(1)-204(n), and other arrangements are also possible. Moreover, one or more of the devices of the ACPG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ACPGD device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information models that describe classes of information and relationships between the information classes for systems and domains of data, and policies and access control rules, which include data access rules that relate to exposure of particular data types to particular entities, functional access rules that relate to an ability to perform particular functions on particular data types, and governing principles that are reflected by the data access rules and functional access rules.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ACPG device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ACPG device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ACPG device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ACPG device 202, the server devices 204(1)-204(n), or the client devices 208(1)-208(n), for example, may be configured to operate as virtual instances on the same physical machine. In other words, one or more of the ACPG device 202, the server devices 204(1)-204(n), or the client devices 208(1)-208(n) may operate on the same physical device rather than as separate devices communicating through communication network(s) 210. Additionally, there may be more or fewer ACPG devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
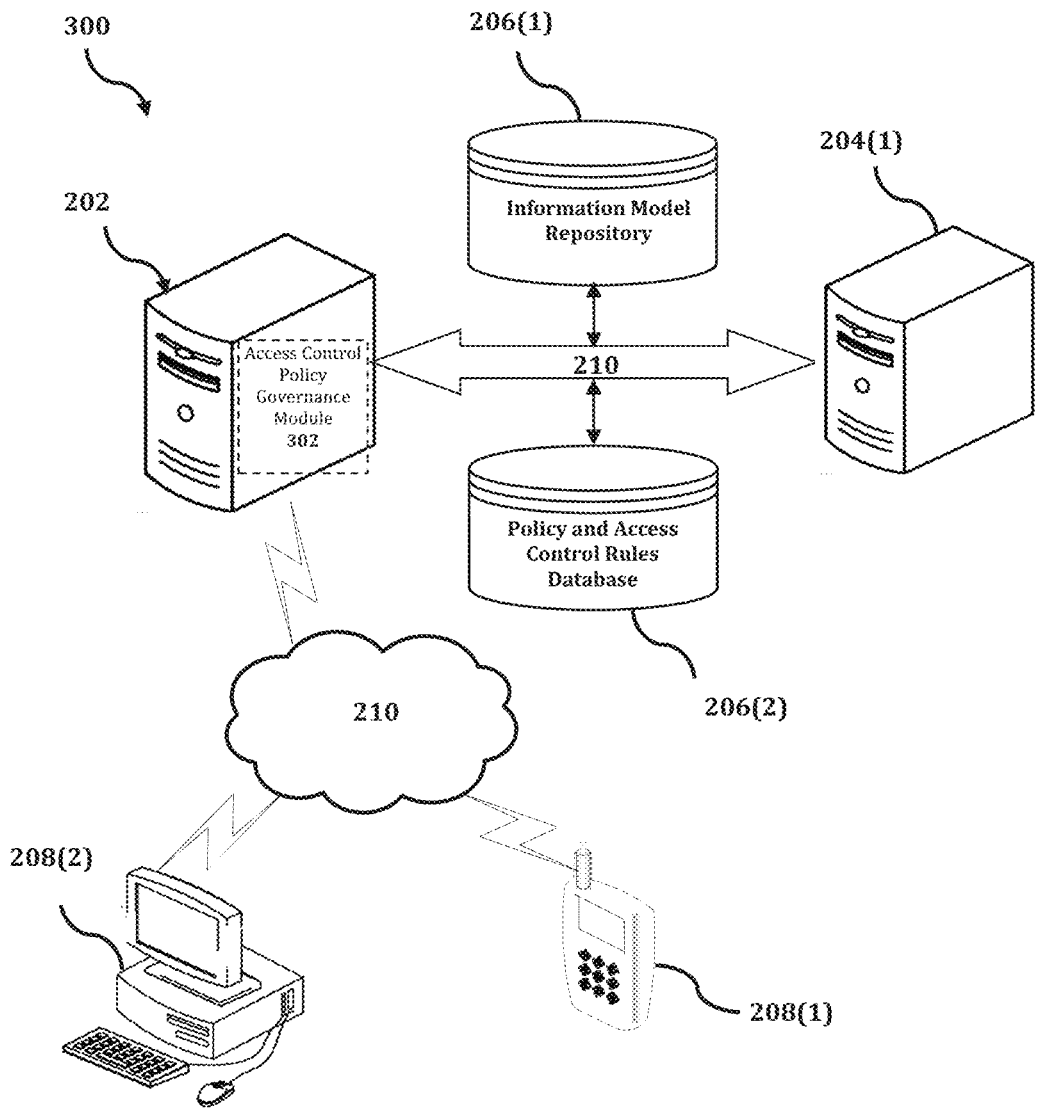
FIG. 3 shows an exemplary system for implementing a method for governing a policy for controlling functional access and data access to information resources.

The ACPG device 202 is described and shown in FIG. 3 as including a access control policy governance module 302, although it may include other rules, policies, modules, databases, or applications, for example. As will be described below, the access control policy governance module 302 is configured to implement a method for governing a policy for controlling functional access and data access to information resources in an automated, efficient, scalable, and reliable manner.

An exemplary process 300 for implementing a mechanism for governing a policy for controlling functional access and data access to information resources by utilizing the network environment of FIG. 2 is shown as being executed in FIG. 3. Specifically, a first client device 208(1) and a second client device 208(2) are illustrated as being in communication with ACPG device 202. In this regard, the first client device 208(1) and the second client device 208(2) may be "clients" of the ACPG device 202 and are described herein as such. Nevertheless, it is to be known and understood that the first client device 208(1) and/or the second client device 208(2) need not necessarily be "clients" of the ACPG device 202, or any entity described in association therewith herein. Any additional or alternative relationship may exist between either or both of the first client device 208(1) and the second client device 208(2) and the ACPG device 202, or no relationship may exist.

Further, ACPG device 202 is illustrated as being able to access an information model repository 206(1) and a policy and access control rules database 206(2). The access control policy governance module 302 may be configured to access these databases for implementing a method for governing a policy for controlling functional access and data access to information resources.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ACPG device 202 via broadband or cellular communication. Of course, these embodiments are merely exemplary and are not limiting or exhaustive.

Upon being started, the access control policy governance module 302 executes a process for governing a policy for controlling functional access and data access to information resources. An exemplary process for governing a policy for controlling functional access and data access to information resources is generally indicated at flowchart 400 in FIG. 4.

Figure 4:
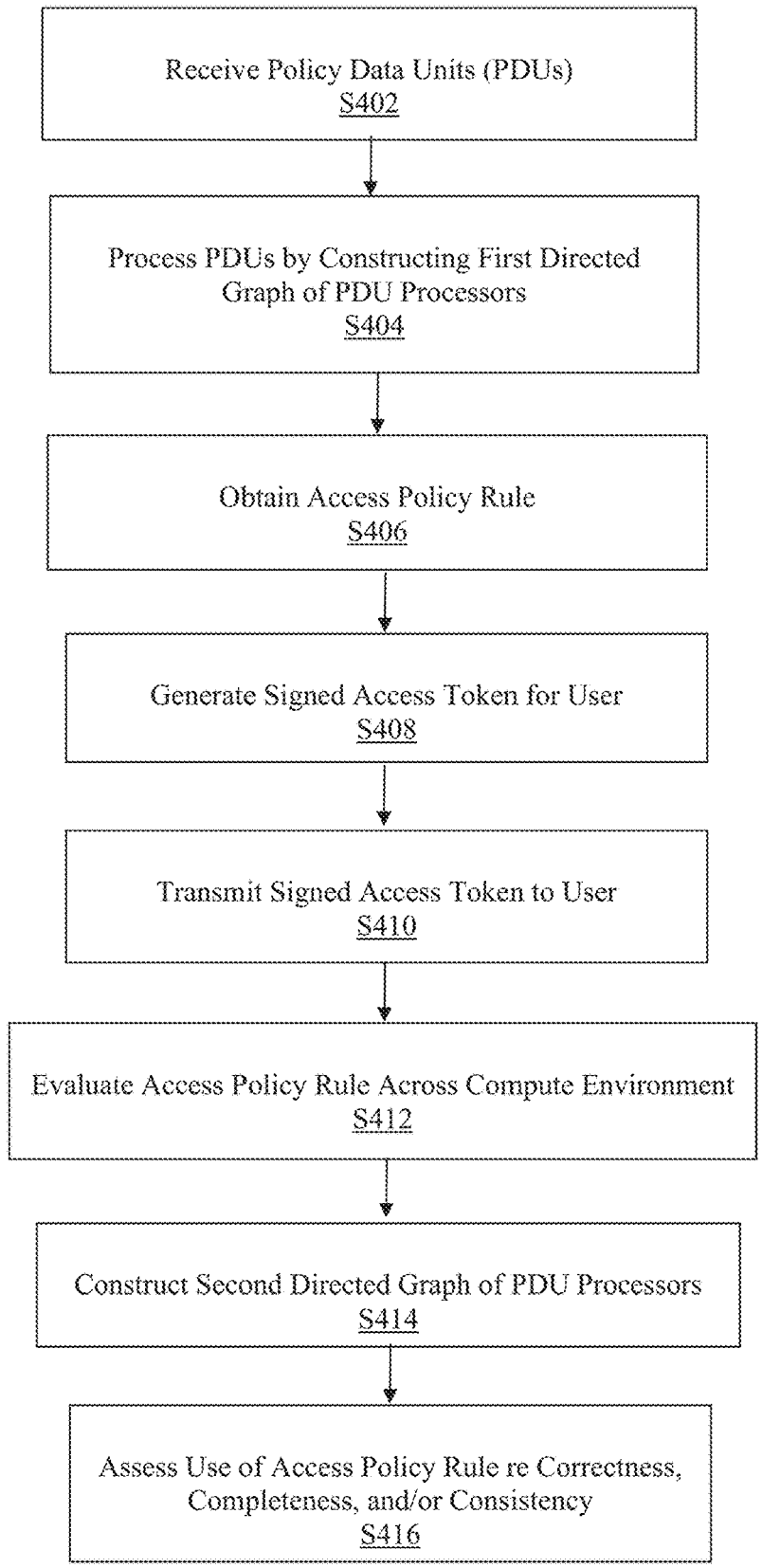
FIG. 4 is a flowchart of an exemplary process for implementing a method for governing a policy for controlling functional access and data access to information resources.

In the process 400 of FIG. 4, at step S402, the access control policy governance module 302 receives a set of policy data units (PDUs), each of which includes information that relates to an access determination within a system of information resources. The PDUs are discrete packages of data and logic that can be efficiently processed for manageable, transparent, and ultra-fine grain access control. In an exemplary embodiment, the set of PDUs may include a first simple type of PDU that contains a header and data with no policy logic, a second simple type of PDU that contains a header and policy logic with no data, and/or a compound type of PDU that contains a header, data, and policy logic.

At step S404, the access control policy governance module 302 processes the PDUs, and at step S406, the access control policy governance module 302 obtains an access policy rule based on a result of the processing performed in step S404. In an exemplary embodiment, the processing performed in step S404 includes constructing a first directed graph of PDU processors.

At step S408, the access control policy governance module 302 generates a signed access token for a particular user that is based on the access policy rule obtained in step S406. Then, at step S410, the access control policy governance module 302 transmits the signed access token to the particular user in order to enable that user to access information in accordance with the access policy rule.

At step S412, the access control policy governance module 302 uses the first directed graph to evaluate the access policy rule across a compute environment which is distributed in time and space. In an exemplary embodiment, the evaluation is performed incrementally as corresponding software is built, tested, and deployed. In an exemplary embodiment, the evaluation is performed across a cloud computing environment that varies over time, such that at least one portion of the access policy rule is revised as a result of the variation of the cloud computing environment.

At step S414, the access control policy governance module 302 constructs a second directed graph of the PDU processors. Then, at step S416, the access control policy governance module 302 uses the second directed graph to assess a use of the access policy rule with respect to one or more of correctness, completeness, and/or consistency. In an exemplary embodiment, the assessment of the use of the access policy rule includes using a detective control included in the second directed graph to determine whether the access policy rule is executing as designed and also to determine whether the access policy rule and/or reference data associated therewith has subjected to tampering. In an exemplary embodiment, the second directed graph may also be used to generate an auditable record of decisions made based on the first directed graph.

In an exemplary embodiment, a method for governing a policy for controlling functional access and data access to information resources supports security and access control through the introduction of policy data units (PDUs), that is, discrete packages of data and logic that can be efficiently processed for manageable, transparent, and ultra-fine grain access control. These PDUs are stored and propagated inside a network of PDU processors that are chained together to form a security decision network or fabric. This fabric then yields consistent security behavior, including software identity, authentication and access control, across business services that may be separated in time and space. The resulting security architecture can be adapted to support fine-grained control of the smallest microservice and at the same time can be scaled to handle the largest enterprise businesses.

PDUs can define precise and discrete access controls between any collection of users, data, networks, or functions and address the current gap in access control methodology in a way that is predictable, scalable, correct, manageable, and transparent. Additionally, the same methodology can be used to define controls for PDU lifecycle management. Supporting this PDU-centric methodology is a controls architecture that permits greater accuracy, lower risks, and increased automation.

Motivation: Highly regulated industries, such as, for example, the financial industry, the avionics industry, and the healthcare industry, have the most challenging information access control requirements. The motivation of this present disclosure is to provide a practical mechanism and a design for integrating access control policy inside the controls architecture that is required by these highly-regulated organizations to ensure proper governance of access control.

Evaluation of a data access, controls or service policy can be efficiently achieved by evaluation of information composed of an expression and supporting data. In practice, the data that is required by the policy may be controlled in different systems and at different points in an ongoing lifecycle of processes—such as development of an application, build, deployment, through access request, approval, recertification, authentication, permissioning, and actual access request. Anything that happens in each of these processes may be subject to mandatory controls driven by regulatory, business, customer or operational requirements.

In an exemplary embodiment, an access control policy (i.e., "Policy") is written into a signed access token issued by an Identity Provider, or Authorization Server according to the pattern of the OpenID Connect (OIDC) standard, and delivered to the Client, which then presents the signed token to the resource server along with the access request. This paradigm introduces a number of critical controls—authentication of the User by the Identity Provider, safe delivery of the token to the Client, and the Application's signature check of the token by the identity provider—thus insuring that this Application is the correct recipient.

In an exemplary embodiment, the token is always issued before the access request is made, and the token has a lifespan which allows it to be stored by the Client and re-used for multiple access requests. This means that the architecture is being partitioned in time and place, in the sense that the policy and the user attributes in the token are established at one point in time and place, and they are then passed to the application, which uses them in the context of a subsequent evaluation. Essentially the architecture supports temporality and distributed resolution.

Policy Data Unit: In an exemplary embodiment, the present disclosure provides a general framework which allows information and policy to flow through systems so that the evaluation of policy can be performed incrementally at different points in time and place across a very general notion of Lifecycle, which allows for directly linking the evaluation of policy and the retrieval of data into the systems where they are best controlled.

FIG. 5 is a diagram 500 that illustrates the structure of a policy data unit (PDU), according to an exemplary embodiment. Access control policies and requests for access (i.e., query) to resources are both logical statements. The query (goal) is to be evaluated against at least one Policy Data Unit (PDU). Referring to FIG. 5, a PDU 500 contains a header, policy logic and data. The PDU can be in two forms, simple or compound. In particular, the PDU may contain data or policy logic or both—as in the case of the compound PDU 500. The output from evaluating a goal against a PDU is another PDU. Each PDU can be either ephemeral or persistent—and reusable. Header data information is used to support routing, lineage, authentication, and other security-related features.

Usage: The benefit of the PDU is realized as it is evaluated. At any step during the processing lifecycle of a PDU, a resulting output PDU may be used to describe a query or permitted access. This may be used to control user-to-data, user-to-system, or system-to-system information flow. The query is evaluated against the PDU, and the result yields a PDU that can answer the query—subject to certain unknowns being supplied.

When a user attempts a specific access, resolution can be either a permit or deny or emitted as another simple or compound PDU. If there are no unknowns, the first case is trivial and the resolution is a permit, deny, singleton or a set. In a case where there are remaining unknowns, the partial evaluation yields a conditional that can be passed on for further evaluation. For example, a business rule may state that any user may have access to only records created by that same user. An input PDU may contain a user's identifier and the output condition builds an expression using the user's identifier. This evaluation process emits a new PDU with the predicate that is needed to filter out any non-permitted data.

FIG. 6 is a diagram 600 that illustrates a combination of PDUs into a chain, according to an exemplary embodiment. PDU Evaluation Lifecycle: Referring to FIG. 6, PDU processing steps can be chained, as shown in PDU sequence 600, and even built into networks so that the most complex access control policies can be managed across the largest enterprises. Further, PDUs can be used to test and prove that proposed policy PDUs are correct, prior to their deployment.

Benefit: This atomized approach to access control permits the design of access schemes that break down the ultimate access decision into a series of point decisions that localize the evaluation to where the data and policy information is subject to optimal controls. With this approach, final evaluation can be performed just before the resource is actually accessed. As a consequence, access control processes can be made more performant, manageable, secure and transparent.

Figure 7:
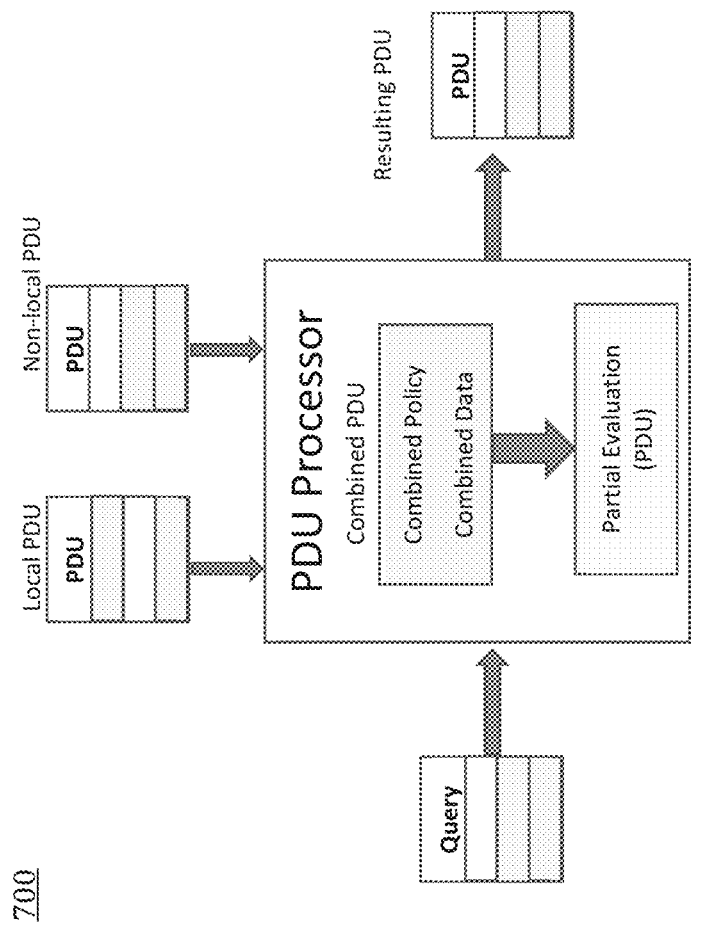
FIG. 7 is a diagram that illustrates a general pattern for PDU processing where an input PDU is combined with a local PUD that is true over a local domain, according to an exemplary embodiment.

PDU Processing: Referring to FIG. 7, the diagram 700 shows a general pattern for PDU processing where an input PDU is combined with a Local PDU that is true over a local domain. This is essentially a union of Policy and of Data—and possibly a non-local PDU, that is, an expression over a larger domain. Through the process of partial evaluation a resulting output PDU is generated. A policy evaluation simply takes one or more unproven or proven PDUs, merges them together, and emits one or more PDUs, which may be proven, unproven or conditional. Proven PDUs are essentially "permitted" requests, unproven PDUs are "denied" requests, and conditional PDUs that are permitted under specific conditions that can be computed later. Although diagram 700 illustrates a simple case, any number of inputs and outputs are possible. This means that in an exemplary embodiment, this approach can merge and branch arbitrarily across a complex lifecycle.

The result of evaluation is a PDU and a query, and it is the PDU, which can be combined with one or more other PDUs, that is necessary to resolve the query.

A PDU contains sufficient resource location information so that it can request services via application programming interfaces (APIs). Combined with the use of validation tokens, this allows PDUs to access or provide a number of permitted functions.

In an exemplary embodiment, the PDU processors must validate that the PDU has access to the data and policy information being requested by the PDU. The PDU processors must also provide the PDU with additional information so that the request for processing can be completed; the PDU processors must be able to evaluate the request; and PDU processors must be able to route output PDUs to other PDU processors or query drivers based on the status of the result. Additionally, PDU processors can create, destroy, merge and split (or any combination of these) PDUs. Further, the mechanism for performing these transformations is aware of the dual (i.e., data and logic) nature of PDUs.

The routing of the output PDU is also determined by policy and data within the resulting PDU, and thus the workflow choreography is subject to the same controls as the Policy being evaluated.

Interactions and Trust amongst PDU Processors: Because PDUs are the instantiation of access control intelligence, it is essential that modification, creation and destruction of PDUs be performed using appropriate controls and testing protocols.

In an exemplary embodiment, in order to provide a correct controls architecture, the partitioning of the policy is not optional; the PDU Processor will, in general, not trust the issuer of an Input PDU, or even the Non-Local PDU, and may be required to validate it. The validation policy cannot be in the incoming PDU, but instead is supplied from another source, possibly in the Local PDU. Furthermore, the Local PDU is established inside the PDU processor, and requires its own control. In an exemplary embodiment, this interaction also occurs over a network of PDU Processors.

In an exemplary embodiment, the Local PDU may be sourced in one of at least two ways: 1) The local PDU may be updated by an external agent, periodically at runtime; or 2) the local PDU may be installed by a software deployment pipeline and is immutable for the duration of the lifetime of the PDU Processor.

In case 1, the PDU Processor receives the Input PDU through an API call in a way which is analogous to the Input Policy, with a query relating to the storage of the PDU, and it evaluates Policy locally to determine how/whether the PDU is persisted.

In case 2, there is typically an interaction between a software agent (e.g., a Continuous Deployment Job Instance) and the Platform (e.g. the Cloud Service) which instantiates the PDU Processor, in which case the Platform itself acts as a PDU Processor and evaluates its own Policy about instantiation to determine whether or not the PDU Processor can be instantiated and the local PDU bound into it.

General Pattern of PDU Risk and Controls: Controls on both Local and Input PDU are required to establish at least the following: 1) PDU is intended to have been issued to the Policy Evaluator; 2) the PDU is issued by a Software Agent which has a relationship of trust with the Policy Evaluator; 3) the lifetime of the PDU is correctly established; 4) the PDU has not expired at the point of Policy Evaluation; 5) the PDU is not tampered with in transit; 6) the PDUs are not tampered with between receipt and combination; 7) the PDUs are combined by a software agent which is known to function correctly; 8) the Combined PDU is not tampered with; 9) the Partial Evaluation is performed by a Software Agent that is known to function correctly; 10) it is possible to track through the sequence of Partial Evaluations to identify the elements of base policy that determine access; and 11) each evaluation performed by a PDU processor is logged.

At the input terminals of the workflow where Policy and data are sourced from external Policy or Data Stores, there are controls over those sources to ensure each of the following: 1) In the case of metadata and policy, there is traceability to requirements for any change; 2) ownership and approval are required for changes to at least Policies, metadata and User Attributes; 3) policies are shown to be consistent with other policies within a PDU and across a policy set; 4) all processes are tested and test evidence is made available; and 5) user attributes in PDUs are subject to additional controls and/or confidentiality requirements. Reconciliation and Exception Management Process are required for many of the controls.

Use Case Data Access Policy with an Access Token: One of the most common problems in data access control involves the integration of identity provider services with user data access requests in a way that supports fine-grain data access control. This use case illustrates a high-level, controlled data flow using PDUs to support this integrated function. By partitioning the full computation across the time and space, the necessary data inputs are available when and where needed.

Figure 8:
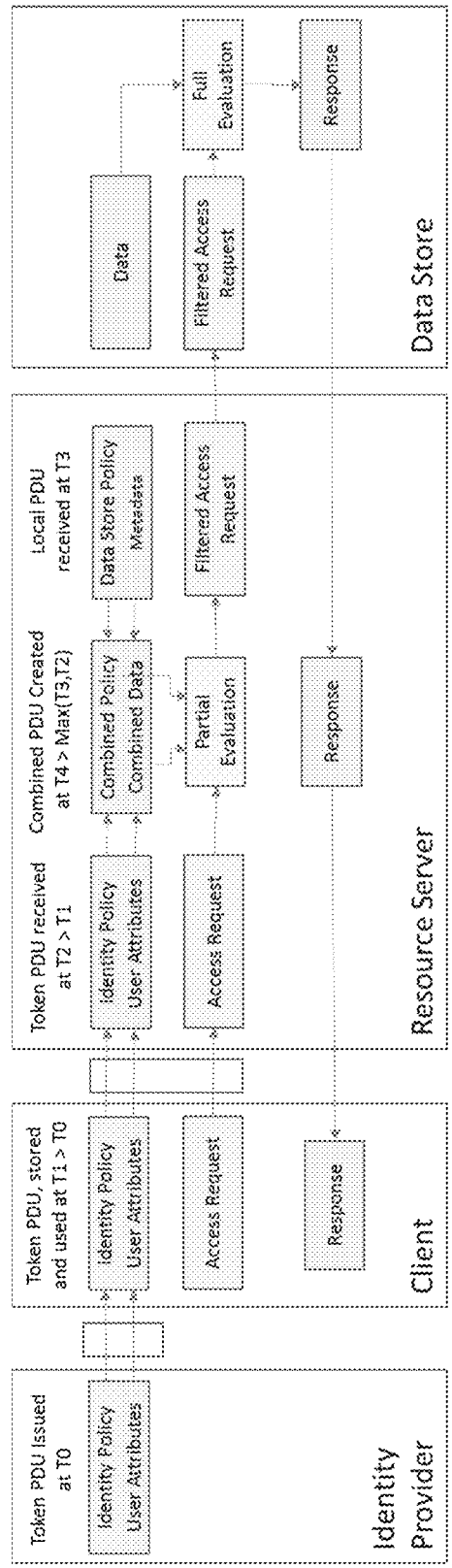
FIG. 8 is a diagram that illustrates a use case for integrating identity provider services with user data access requests in a way that supports fine-grain data access control, according to an exemplary embodiment.

FIG. 8 is a diagram 800 that illustrates a use case for integrating identity provider services with user data access requests in a way that supports fine-grain data access control, according to an exemplary embodiment. Referring to FIG. 8, in this scenario, the client is accessing data stored in a relational database, which is protected by a Resource Server, such as, for example, a middle tier in the popular three-tier architecture. In the illustration 800, the User is interacting with a software Client (e.g., a query tool) which issues HyperText Transfer Protocol (http) requests to the Resource Server.

At time $T_0$, a user authenticates with an Identity Provider and requests a token to be issued to the Client. OpenID Connect (OIDC), for example, provides a number of schemes for doing this. The contents of the Token include a PDU. At a time $T_1>T_0$, the Client stores that token and, on behalf of the user, issues a data access request to the Resource Server. This request is accompanied by the Access Token, which is received by the Resource Server at some time $T_2>T_1$.

Meanwhile, at time $T_3$, the Resource Server has acquired a separate PDU which contains metadata and policy that relates to the Data Store. In order to correctly respond to the User's Access Request, the Resource Server merges the Policy and Data from the token with the Policy from its local PDU. At this point the PDU containing the combined Policy and Data and can then be partially evaluated. This partial evaluation is translated into a filtered access request in the native language of the data store (typically SQL), where it can then be fully evaluated and the response can be created. This response data set is then returned to the client by way of the Resource Server.

Use Case: Chaining Evaluations across the Software Development Lifecycle. The benefits of using PDUs across time and space can be illustrated as part of the lifecycle of software development (including the development of access control policy). Historically the process of capturing and deploying access control rules for fine-grain access control has been opaque, error prone and difficult to manage. This is largely because of the need to translate requirements across knowledge domains and areas of specific expertise (legal, business, technology specific) without having a way to formalize and automate the process. In an exemplary embodiment, once policy is captured in a formal language, PDUs provide an opportunity to automate the technical component.

Figure 9:
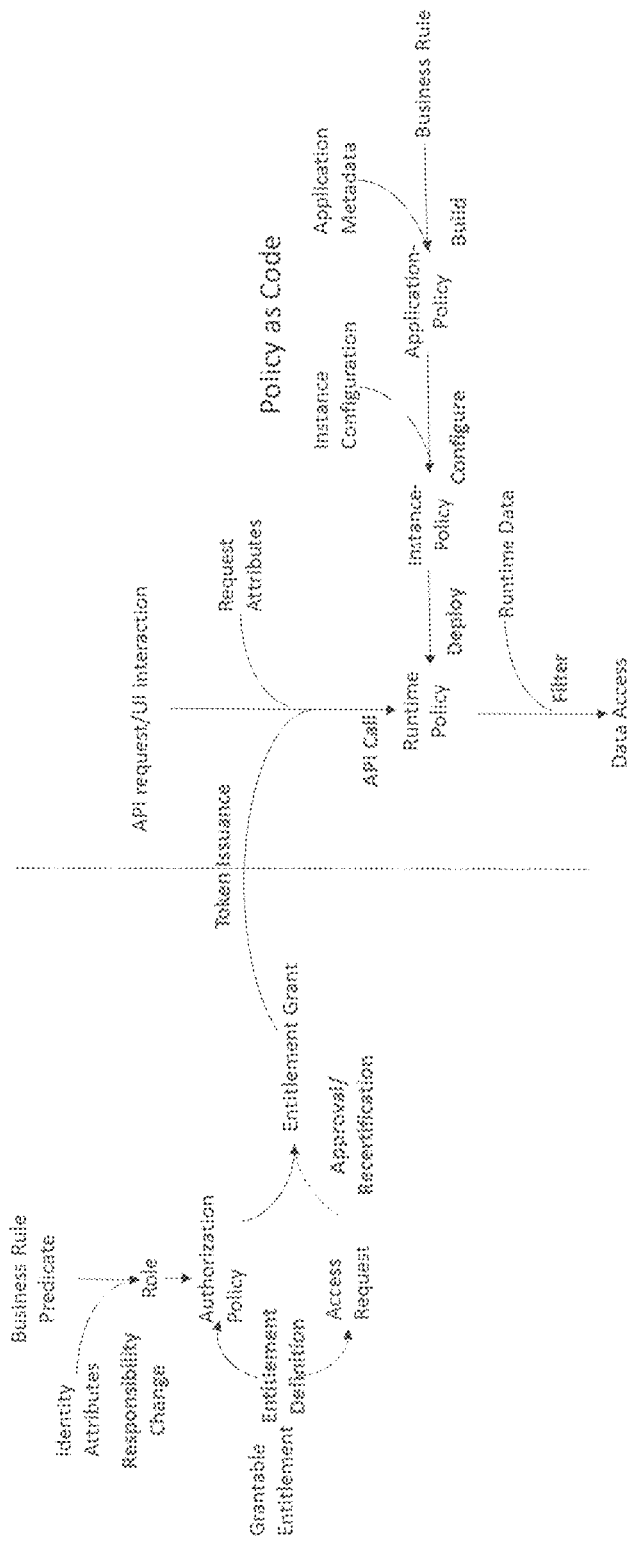
FIG. 9 is a diagram that illustrates how the PDU processing architecture can be partitioned in time and space to achieve an implementation of an access control system, according to an exemplary embodiment.

Referring to FIG. 9, the diagram 900 shows how the PDU Processing Architecture can be partitioned across various points in time and space so as to achieve an implementation of a method and system for controlling access to data, according to an exemplary embodiment.

In this scenario, the integration data may be traced at three stages of the policy development and deployment lifecycle. During the creation of the policy, application metadata is required. This metadata, for example, might describe constraints specific to the geographic locations where that application is to operate. Instance policy might be specific to the environment where the application runs. For example, constraints on data access on production, testing, and development environments are frequently different. Further, a policy may require parameters or other data that define limits or thresholds or otherwise affect when and how that policy is applied. For example, a policy may place a limit on the dollar amount of an individual transaction; the dollar limit may be supplied as a transaction-specific data value.

In diagram 900, at the rightmost portion of the diagram, there is an input specification for a business rule. It is assumed that Trader X has been assigned Role A, and Role A is defined as being able to trade product B, has access to production data only on a production platform, and there is a geographical constraint that personally identifiable information (PII) must always be masked when the data is from Country E. Further, there is an additional runtime constraint providing a $10,000,000 ceiling on the total dollar value of trades that can be done in a single day. The following is a description of the Build, Configure and Runtime time periods.

During the build process, a PDU containing the logic and data required to define Role A is provided as an input. At this point in time, there are no users, but the policy needs to be tested as part of a normal systems development life cycle (SDLC) process. Further, unit, integration, consistency, regression and stress testing can be performed at this stage. Metadata, in the form of PDUs, supporting these tests is available at this stage. Once the policy has passed this build phase, it can be configured for the various environments on which it will operate. Metadata inputs at this phase may support policies related to the source of requests, nature of the data that can be accessed (e.g., development, test or production) or other metadata needed to configure specific instances. At run time, additional information provided by PDUs will support pre-access tests for trading limits and the necessity to mask PII data based on local regulations.

Figure 10:
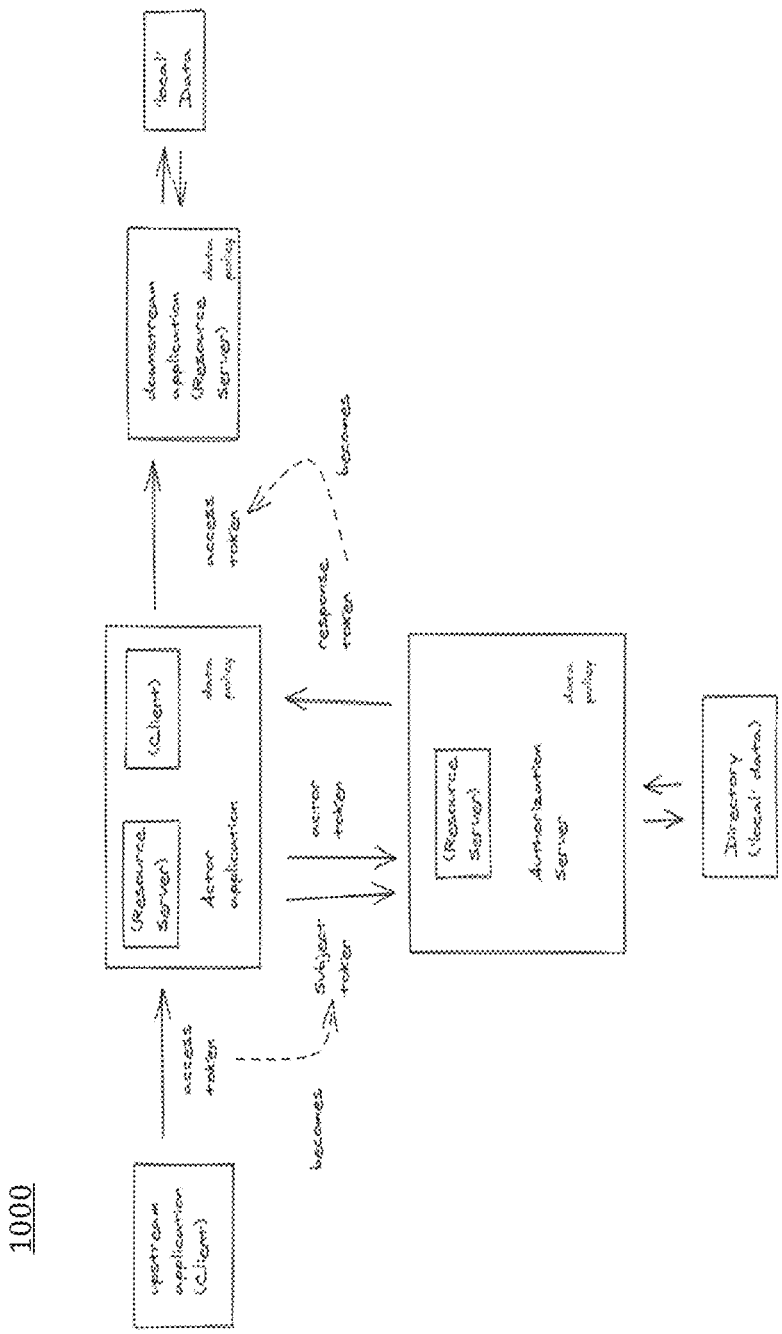
FIG. 10 is a diagram that illustrates a PDU-centric architecture that supports and integrates security patterns that implement security tokens, according to an exemplary embodiment.

FIG. 10 is a diagram 1000 that illustrates a PDU-centric architecture that supports and integrates security patterns that implement security tokens, according to an exemplary embodiment. Use Case: Support for new and emerging security architectures: Referring to FIG. 10, in an exemplary embodiment, a PDU-centric architecture 1000 can support and integrate with other security patterns that implement security tokens, such as, for example, JSON Web Tokens (JWTs) and Security Assertion Markup Language (SAML) assertions. Also supported is an implementation of the extension of OAuth 2.0 known as OAuth 2.0 Token Exchange. In an exemplary embodiment, a Security Token Service (STS) that can both validate and reissue security tokens is available. PDUs can support the creation, signing, encrypting, transport and routing of security tokens used in this design. These token-bearing PDUs may contain the necessary parameters, including grant type, resource, audience, and scope, as well as other required and optional fields. Further, PDU processors can be configured to provide the required validation and reissuance of new security tokens.

An Authorization Server functioning as a STS may initially function as a Resource Server as it accepts tokens to determine whether the token request is permitted. To do this, the Authorization Server applies the policy that was pre-shared between the issuer of that token and itself. Then, the Authorization Server uses the information in those tokens in conjunction with local data and a local token issuance policy which describes the contract between it and the intended audience. This results in the generation of a new response token.

The general architecture can be set up with the Resource server handling input requests and the OAuth Client handling outputs. The upshot is that PDU-centric architectures provide fundamental building blocks for the construction of security architectures.

Figure 11:
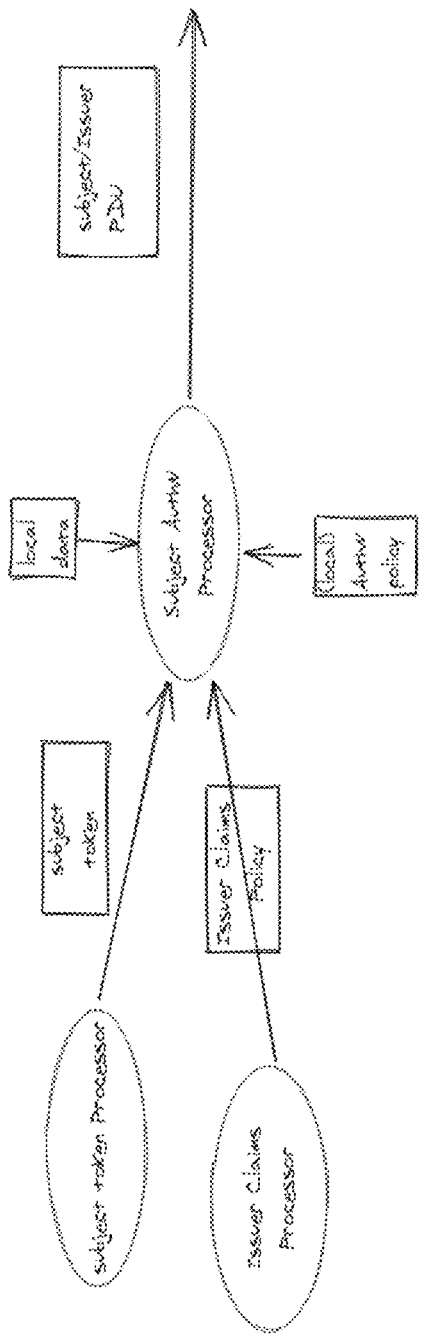
FIG. 11 is a diagram that illustrates a service instantiation in a cloud computing environment, according to an exemplary embodiment.

FIG. 11 is a diagram 1100 that illustrates a service instantiation in a cloud computing environment, according to an exemplary embodiment. Use Case: Service Instantiation in a Cloud: Referring to FIG. 11, as illustrated in diagram 1100, within a cloud/microservice environment, individual service instances such as databases, message brokers, or stateless functions (i.e., lambdas) are managed by a service broker and instantiated on behalf of higher-level applications or services. Typically, the service broker receives a request to create or assign a service to a particular account or subscription that is owned by a user. As a part of instantiation, the service broker establishes the identity of the service instance by use of a security token and then binds the service instance to the specific account or subscription. As the service instance is created, it is registered with an identity provider, with sufficient information about the service instance to support later authentication. Service authentication is its own technical and security domain, including the management and proof of authentication factors that establish the service identity and prove that a specific workload is definitively a part of that service instance. At time of authentication, the Identity Provider (IdP) provides claims about a specific workload, consistent with various industry-standard protocols such as SAML or OAuth, and carried in a digital certificate using an appropriate standard form such as X.509 or Java Web Token.

Although a digital claim contains data without policy, the digital claim fits into the PDU architecture and can be treated as a PDU. Separately from the claim itself, the IdP has a set of rules governing how the claim was constructed, what the claim refers to, and how the contents must be interpreted—that is, the IdP has an "Issuer Claims Policy" that can be associated with the claim. In most protocol implementations such as OAuth or SAML, this Issuer Claims Policy is typically not delivered with the claim itself, but instead is treated as implicit by the claim's audience. In this regard, the audience "knows how to interpret the claim." The PDU architecture makes this knowledge explicit. The Issuer Claims Policy forms a second PDU that carries the interpreting rules, and the Authentication Processor then combines claim with policy. The rules governing authentication, describing the required risk levels, acceptable authenticators, and so forth, can be described separately as local policy, and may be supplemented by local context information.

The "end of the pipeline" is an OAuth Resource Server which receives a request to perform an action on its Protected Resources and decides whether the accompanying token permits the action and returns some information about the Protected Resource.

Figure 12:
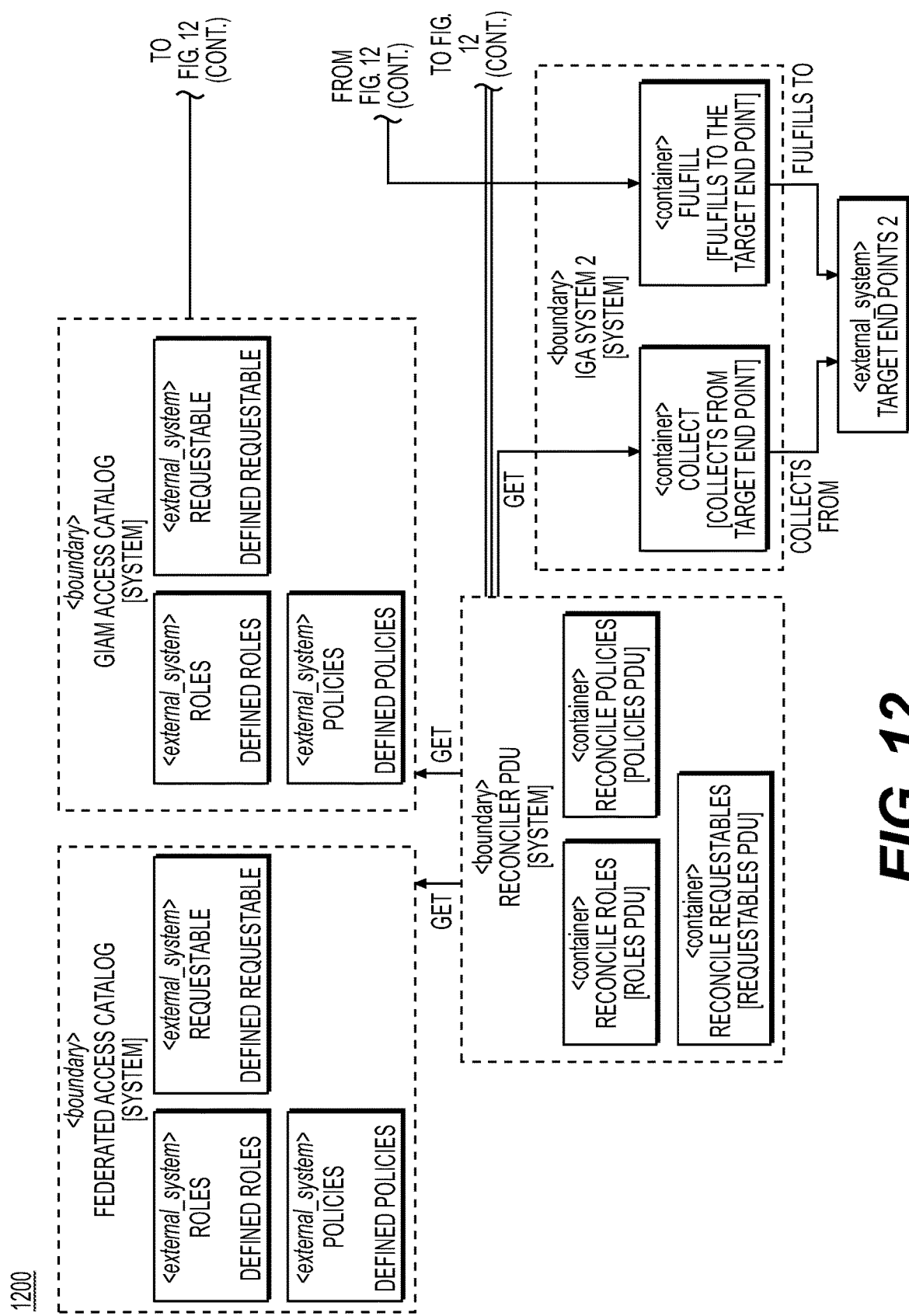
FIG. 12 is a block diagram that illustrates a PDU network that is usable for reconciliation across identity governance and administration systems, according to an exemplary embodiment.

Use Case: Reconciliation of Identity Governance and Administration Systems: Referring to FIG. 12, the diagram 1200 shows a PDU network used to reconcile across Identity Governance & Administration (IGA) systems, according to an exemplary embodiment. In this use case, the PDU is used to facilitate the reconciliation and fulfillment across a distributed set of IGA systems.

Historically, reconciliation problems have typically been addressed with a single multi-dimensional "data cube" that contains a block of all related information, and a single set of rules that walks through the data cube in arbitrary directions as needed. This inherently presents a problem of scale and performance. The PDU architecture, including the partial evaluation capability, allows for refactoring the reconciliation problem such that the data cube is not assembled in one time and place.

When considering the role definition against various role grants in the context of a globally distributed system with thousands of users, it is impractical or even impossible to reconcile the role grants across the enterprise in a single central system. The alternative is to apply reconciliation policy in a distributed fashion, "walking" through the enterprise to reconcile the definition against role grants that may be maintained and managed in individual data stores. Further, as the reconciliation walks through different application contexts, each application context may require its own specialized actions to accomplish the reconciliation. Such application-specific actions can be described in separate policies, provided as local policy to individual PDUs.

Use Case: Using policy to manage policy: Once partial evaluation is enabled, complex control use cases can be supported through a directed graph of PDU processors. This allows for an evaluation of a current state against control policy at various stages of the application delivery lifecycle, the service management lifecycle, and/or the data management lifecycle and a subsequent combination of these evaluations to build up an incremental view of controls to meet access and other security requirements. This directed graph contains nodes and edges; the nodes are PDU processors, and PDUs flow along the edges in the direction of the graph. The directed graph itself is subject to inspection and review, and in order to support this class of activities, PDU Processors are required to support audit operations. However, because the network is loosely coupled, each individual PDU processor may lack overall context information to support an end-to-end audit. In an exemplary embodiment, a Provenance Ontology is used as a working model, so that each PDU is identified with a uniform resource identifier (URI), and each PDU Processor can emit simple Provenance Ontology statements about activities it performs, referencing the PDUs that it consumes and produces.

This facilitates an ability to audit Provenance records and collect information about partial evaluations. The process of audit is itself controlled by policy that is articulated as PDUs. As a consequence, the audit process itself can be described, deployed, and managed using the same policy infrastructure that is used to address earlier use cases.

In an exemplary embodiment, using the network of securely managed PDUs makes possible the creation of access control schemes that are flexible enough to scale to the largest problem spaces. Their support of both synchronous and asynchronous access control, while providing appropriately partitioning of the necessary decision space, supports the creation of controls architectures that can be deployed and efficiently operated against a wide variety of access control use cases.

Accordingly, with this technology, an optimized process for governing a policy for controlling functional access and data access to information resources is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for governing a policy for controlling access to a system, the method being implemented by at least one processor, the method comprising:

receiving, by the at least one processor, a plurality of policy data units, each respective policy data unit including information that relates to an access determination with respect to the system;

processing, by the at least one processor, the plurality of policy data units, and obtaining an access policy rule as a result of the processing;

generating, by the at least one processor before an access request is made, a signed access token that relates to a predetermined user based on the obtained access policy rule; and transmitting, by the at least one processor to the predetermined user before the access request is made, the signed access token, wherein when the access request is made, the signed access token is usable for generating one of the following: access permission, access denial, or a new policy data unit; and wherein the signed access token has a lifespan and is reusable by the predetermined user for multiple access requests.

2. The method of claim 1, wherein the plurality of policy data units comprises at least one first simple type of policy data unit that contains a header and data with no policy logic, at least one second simple type of policy data unit that contains a header and policy logic with no data, and at least one compound type of policy data unit that contains a header, data, and policy logic.

3. The method of claim 1, wherein the processing of the plurality of policy data units comprises constructing a first directed graph of policy data unit processors, and wherein the method further comprises evaluating the obtained access policy rule across a compute environment that is distributed in time and space by using the first directed graph, such that a result of the evaluating includes a query and a new policy data unit that is usable for resolving the query.

4. The method of claim 3, wherein the evaluating of the obtained access policy rule is performed incrementally as corresponding software is built, tested, and deployed.

5. The method of claim 3, wherein the evaluating of the obtained access policy rule is performed across a cloud computing environment that varies over time, such that at least one portion of the obtained access policy rule is revised as a result of a variation of the cloud computing environment.

6. The method of claim 3, further comprising constructing a second directed graph of the policy data unit processors and assessing a use of the access policy rule with respect to at least one from among correctness, completeness, and consistency by using the second directed graph.

7. The method of claim 6, wherein the assessing of the use of the access policy rule comprises using at least one detective control included in the second directed graph to determine whether the access policy rule is executing as designed and to determine whether at least one from among the access policy rule and reference data associated with the access policy rule has been subjected to tampering.

8. The method of claim 6, further comprising using the second directed graph to generate an auditable record of decisions made based on the first directed graph.

9. A computing apparatus for governing a policy for controlling access to a system, the computing apparatus comprising:

a first processor;

a memory; and a communication interface coupled to each of the first processor and the memory, wherein the first processor is configured to:

receive, via the communication interface, a plurality of policy data units, each respective policy data unit including information that relates to an access determination with respect to the system;

process the plurality of policy data units and obtain an access policy rule as a result of the processing;

generate, before an access request is made, a signed access token that relates to a predetermined user based on the obtained access policy rule; and transmit, to the predetermined user before the access request is made via the communication interface, the signed access token, wherein when the access request is made, the signed access token is usable for generating one of the following: access permission, access denial, or a new policy data unit; and wherein the signed access token has a lifespan and is reusable by the predetermined user for multiple access requests.

10. The computing apparatus of claim 9, wherein the plurality of policy data units comprises at least one first simple type of policy data unit that contains a header and data with no policy logic, at least one second simple type of policy data unit that contains a header and policy logic with no data, and at least one compound type of policy data unit that contains a header, data, and policy logic.

11. The computing apparatus of claim 9, wherein the processing of the plurality of policy data units comprises constructing a first directed graph of policy data unit processors, and wherein the first processor is further configured to evaluate the obtained access policy rule across a compute environment that is distributed in time and space by using the first directed graph, such that a result of the evaluation includes a query and a new policy data unit that is usable for resolving the query.

12. The computing apparatus of claim 11, wherein the evaluation of the obtained access policy rule is performed incrementally as corresponding software is built, tested, and deployed.

13. The computing apparatus of claim 11, wherein the evaluation of the obtained access policy rule is performed across a cloud computing environment that varies over time, such that at least one portion of the obtained access policy rule is revised as a result of a variation of the cloud computing environment.

14. The computing apparatus of claim 11, wherein the first processor is further configured to construct a second directed graph of the policy data unit processors and assess a use of the access policy rule with respect to at least one from among correctness, completeness, and consistency by using the second directed graph.

15. The computing apparatus of claim 14, wherein the assessment of the use of the access policy rule comprises using at least one detective control included in the second directed graph to determine whether the access policy rule is executing as designed and to determine whether at least one from among the access policy rule and reference data associated with the access policy rule has been subjected to tampering.

16. The computing apparatus of claim 14, wherein the first processor is further configured to use the second directed graph to generate an auditable record of decisions made based on the first directed graph.

17. A non-transitory computer readable storage medium storing instructions for governing a policy for controlling access to a system, the storage medium comprising executable code which, when executed by a processor, causes the processor to:

receive a plurality of policy data units, each respective policy data unit including information that relates to an access determination with respect to the system;

process the plurality of policy data units, and obtain an access policy rule as a result of the processing;

generate, before an access request is made, a signed access token that relates to a predetermined user based on the obtained access policy rule; and transmit, to the predetermined user before the access request is made, the signed access token, wherein when the access request is made, the signed access token is usable for generating one of the following: access permission, access denial, or a new policy data unit; and wherein the signed access token has a lifespan and is reusable by the predetermined user for multiple access requests.

18. The storage medium of claim 17, wherein the plurality of policy data units comprises at least one first simple type of policy data unit that contains a header and data with no policy logic, at least one second simple type of policy data unit that contains a header and policy logic with no data, and at least one compound type of policy data unit that contains a header, data, and policy logic.

19. The storage medium of claim 17, wherein the executable code is further configured to cause the processor to:

construct a first directed graph of policy data unit processors; and evaluate the obtained access policy rule across a compute environment that is distributed in time and space by using the first directed graph, such that a result of the evaluation includes a query and a new policy data unit that is usable for resolving the query.

20. The storage medium of claim 19, wherein the executable code is further configured to construct a second directed graph of the policy data unit processors and assess a use of the access policy rule with respect to at least one from among correctness, completeness, and consistency by using the second directed graph.

* * * * *